(12) United States Patent
Noord

(10) Patent No.: US 10,352,112 B2
(45) Date of Patent: Jul. 16, 2019

(54) DEVICE AND METHOD FOR SUSPENDING LOADS FROM A BAIL OF AN ELEVATOR OF A DRILLING RIG, AND CORRESPONDING DRILLING RIG ASSEMBLY

(71) Applicant: Jan Noord, Ubbena (NL)

(72) Inventor: Jan Noord, Ubbena (NL)

( * ) Notice: Subject to any disclaimer, the term of this patent is extended or adjusted under 35 U.S.C. 154(b) by 0 days.

(21) Appl. No.: 15/662,465

(22) Filed: Jul. 28, 2017

(65) Prior Publication Data

US 2018/0038174 A1 Feb. 8, 2018

(30) Foreign Application Priority Data

Aug. 4, 2016 (NL) ...................................... 2017287
Sep. 21, 2016 (NL) ...................................... 2017504

(51) Int. Cl.
| | | |
|---|---|---|
| *E21B 19/06* | (2006.01) | |
| *E21B 19/10* | (2006.01) | |
| *F16L 3/01* | (2006.01) | |
| *F16L 3/10* | (2006.01) | |

(52) U.S. Cl.
CPC .............. *E21B 19/06* (2013.01); *E21B 19/10* (2013.01); *F16L 3/01* (2013.01); *F16L 3/10* (2013.01)

(58) Field of Classification Search
CPC .. E21B 19/06; E21B 19/10; F16L 3/01; F16L 3/10
See application file for complete search history.

(56) References Cited

U.S. PATENT DOCUMENTS

| | | |
|---|---|---|
| 1,669,401 A | 5/1928 | Davis |
| 4,793,422 A | 12/1988 | Krasnov |
| 2007/0261857 A1* | 11/2007 | Kuttel ................ E21B 19/06 166/380 |
| 2010/0300704 A1 | 12/2010 | Sweeney et al. |
| 2014/0110135 A1 | 4/2014 | Meaux |
| 2015/0337608 A1 | 11/2015 | Lovell |

FOREIGN PATENT DOCUMENTS

| | | |
|---|---|---|
| BE | 538792 A | 6/1955 |
| GB | 2146728 A | 4/1985 |
| WO | 2016161298 A1 | 10/2016 |

OTHER PUBLICATIONS

GB Search from GB1712163.3, dated Nov. 27, 2017.
European Patent Office Search Report dated Apr. 7, 2017 for Netherlands Application No. 2017504.

* cited by examiner

*Primary Examiner* — David J Bagnell
*Assistant Examiner* — Yanick A Akaragwe

(57) ABSTRACT

A device and drilling rig are disclosed for suspending loads from a bail or an elevator of such drilling rig, and method therefor. The device includes an upper bail clamp for clamping around the bail, a lower bail clamp for clamping around the bail, and a connecting part which is connected to the upper bail clamp by means of upper connecting means and connected to the lower bail clamp by means of lower connecting means. The connecting part is further provided with a coupling means for connecting the connecting part to the load to be suspended from the bail. At least one of the upper connecting means allow translational movement of the connecting part with respect to one of the upper bail clamps, while another of the connecting means are arranged to prevent translational movement of the connecting part with respect to the other of the lower bail clamps.

20 Claims, 3 Drawing Sheets

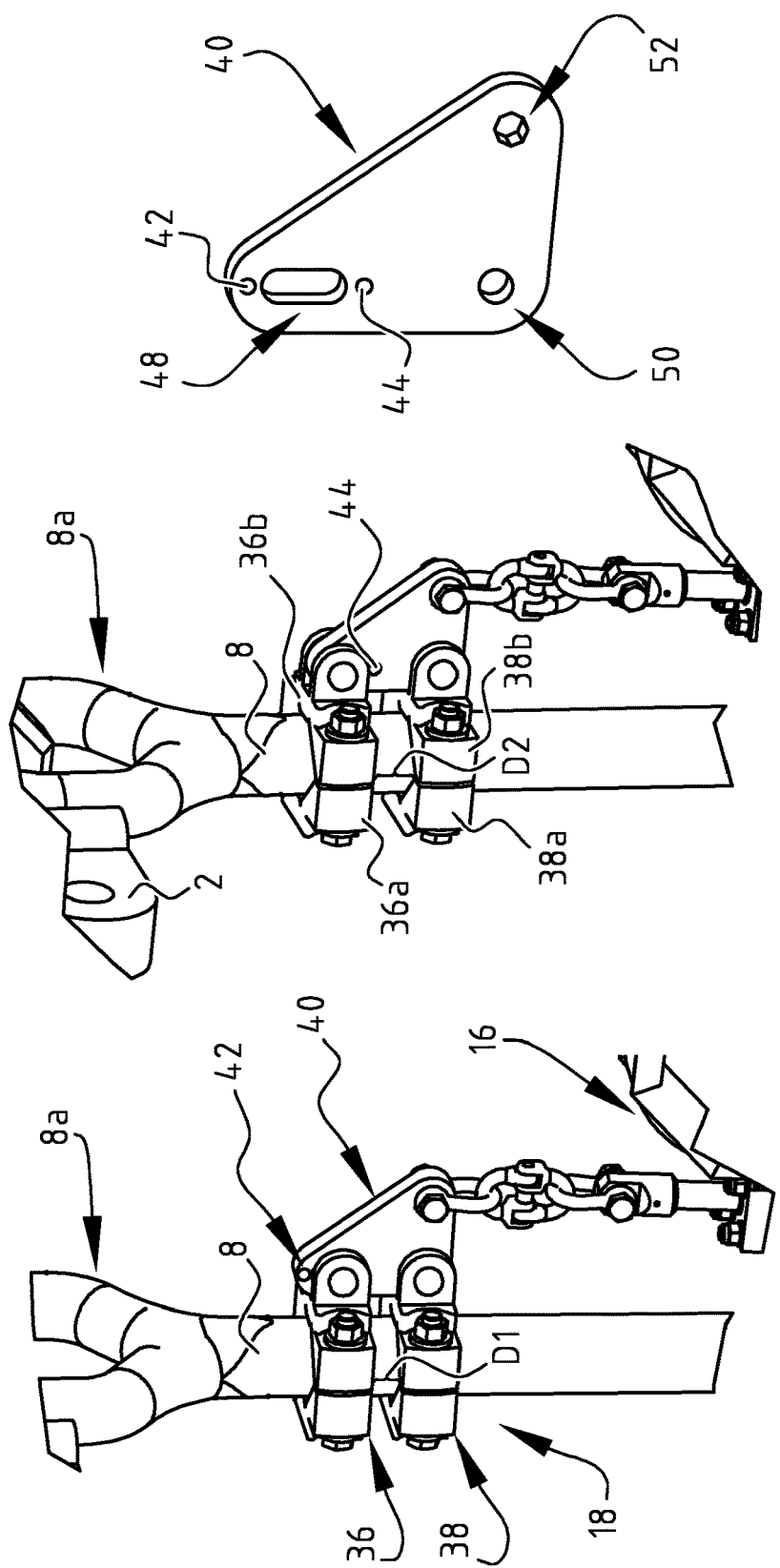

DEVICE AND METHOD FOR SUSPENDING LOADS FROM A BAIL OF AN ELEVATOR OF A DRILLING RIG, AND CORRESPONDING DRILLING RIG ASSEMBLY

The invention relates to a device for suspending loads from a bail of an elevator of a drilling rig. For example, a compensator may be suspending from the bail using the device.

In the oil and gas industry, pipes are used for obtaining the oil or gas. The pipes comprise multiple pipe sections, which are connected end to end, e.g. via a threaded connection, to form a continuous pipe. For forming a pipe which reaches into a well, the pipe sections may be introduced one by one, wherein each time a new pipe section is connected to the uppermost pipe section protruding from the well, after which the pipe is advanced into the well. The positioning of this new pipe section is performed from a drilling rig.

For positioning of the pipe sections, the drilling rig is provided with an elevator, which can grip the pipe section and raise and lower the pipe sections. Such elevators are suspended using elevator bails, commonly referred to simply as "bails" and also known as "elevator links". The elevator bails are usually formed as metal bars having a loop, or "eye", on both of their outer ends. The loop at the upper end of a bail is attached to the drilling rig, e.g. to a top drive or travelling block, and the loop at the lower end of the bail is attached to the main elevator.

Generally, it is desired to prevent movement of single joints of pipe by the main elevator, as the tool is not designed or configured to delicately handle the relatively small weight of a single joint and follow the small movements when this pipe section is added to or removed from the string. For this reason a single joint handling system may be provided with a compensator and a single joint elevator. However, such a compensator should be suspended from a top drive or other means for moving the single joint elevator. In general, drilling rigs only provide a limited number of suitable structures for suspending loads. Particularly few options are available for suspending loads that are required to move with the lifting means, the top drive and/or the elevator.

It is known in practice to suspend a compensator from the upper loop of an elevator bail by means of steel wires. However, this type of suspension is unreliable and unsafe. The steel wires may fail, leading to damage to the pipes and/or the rig, and in the worst case to injuries of workers. Nevertheless, such type of suspension is used in practice due to the lack of a safe solution.

A goal of the invention is therefore to provide a device to overcome or at least reduce the above disadvantages, in particular a device for safely suspending loads, such as a compensator, from a bail of an elevator of a drilling rig.

This goal is achieved by the device for suspending loads from a bail of an elevator of a drilling rig according to embodiments of the invention.

In an embodiment, the device comprises an upper bail clamp for clamping around the bail and a lower bail clamp for clamping around the bail. The device further comprises a connecting part which is connected to the upper bail clamp by means of upper connecting means and connected to the lower bail clamp by means of lower connecting means. The connecting part is further provided with a coupling means for connecting the connecting part to the load to be suspended from the bail. Preferably, the upper connecting means are arranged to allow translational movement of the connecting part with respect to the upper bail clamp, while the lower connecting means are preferably arranged to prevent translational movement of the connecting part with respect to the lower bail clamp.

By clamping the device to the bail, an additional suspension point is created for suspending a load.

The upper connecting means are arranged such that a translational movement, typically a downwards movement, of the connecting part with respect to the upper bail clamp is possible. Preferably, the upper connecting means are arranged such that if the load suspended from the device exceeds a predetermined load, the connecting part moves downward with respect to the upper bail clamp.

Therefore, an overload, i.e. a load exceeding a predetermined load, leads to displacement of the connecting part with respect to the upper bail clamp, while the connecting part is not displaced with respect to the lower bail clamp. Therefore, the overload can be observed by the worker and appropriate measures can be taken.

In an embodiment, the upper connecting means comprise an elongated slot and a male part for insertion in said elongated slot, wherein the male part is movable within the elongated slot.

In other words, in this particular embodiment the translational movement of the connecting part with respect to the upper bail clamp is made possible by providing an elongated slot wherein a corresponding male part can perform a translational movement.

In a first example, the elongated slot is provided in the connecting part. The male part is for example a bolt which extends through the elongated slot of the connecting part.

In a second example, the elongated slot is provided in the upper bail clamp. The male part is for example a bolt which extends through the elongated slot of the upper bail clamp.

In an embodiment, the lower connecting means comprise an opening provided in the connecting part or the lower bail clamp, and a further male part for insertion in said the opening.

Preferably, the opening an further male part are dimensioned such that the male part fits tightly in the opening, allowing substantially no translational movement of connecting part with respect to the lower bail clamp.

In an embodiment, the connecting part is plate-shaped.

In a further embodiment the plate-shaped connecting part has a substantially triangular form.

In an embodiment, wherein the upper connecting means comprise an elongated slot and a male part, the lower connecting means comprise an opening and a further male part, and the connecting part is triangular and has a plate-shape, the elongated slot or the male part of the upper connecting means are provided near a first corner of the triangular connecting part, while the opening or further male part of the lower connecting means are provided near a second corner of the triangular connecting part, and the coupling means for connecting the connecting part to the compensator is provided near a third corner of the triangular connecting part.

In an embodiment, the device further comprises an indicator arranged to indicate the position of the connecting part with respect to the upper bail clamp.

In a further embodiment, the indicator is arranged to indicate a first position of the connecting part with respect to the upper bail clamp as a safe position, and to indicate a second position, wherein the connecting part has moved with respect to the first position, as an unsafe position.

In an embodiment, an inner surface of the upper bail clamp and/or the lower bail clamp, which inner surface in use faces the bail, has at least one rounded off edge for contacting the bail.

In a further embodiment, the inner surface comprises two rounded off edges.

In a further embodiment, a groove is provided between the rounded off edges of the inner surface.

In an embodiment, the upper bail clamp and/or the lower bail clamp have a clamping portion comprising of two interconnectable parts, preferably having a substantially V-shaped cross section or a substantially C-shaped cross section.

The invention further relates to a drilling rig assembly comprising at least one elevator suspended from bails, a compensator connected to the elevator, and the device as described above which is connected to the compensator and at least one of the bails.

The invention also relates to a method for suspending a load from a bail of an elevator of a drilling rig, using the device as described above, the method comprising:
- clamping the upper bail clamp around the bail;
- clamping the lower bail clamp around the bail, at a position below the upper bail clamp; and
- connecting the load to the coupling means of the connecting part.

In particular, the method may comprise connecting a compensator to the bail of the elevator by connecting the compensator to the coupling means of the connecting part.

The advantages and effects described above in relation to the embodiments of the device apply correspondingly to the drilling rig assembly and method in accordance to embodiments of the invention.

Further advantages, features and details of the invention are elucidated on the basis of preferred embodiments thereof, wherein reference is made to the accompanying figures:

FIG. 2A shows the device of the embodiment of FIG. 1 in a safe operating state;

FIG. 2B shows the device of the embodiment of FIG. 2 in an unsafe operating state;

FIG. 3 shows a connecting plate of a device of an embodiment of the invention;

Figure 1:
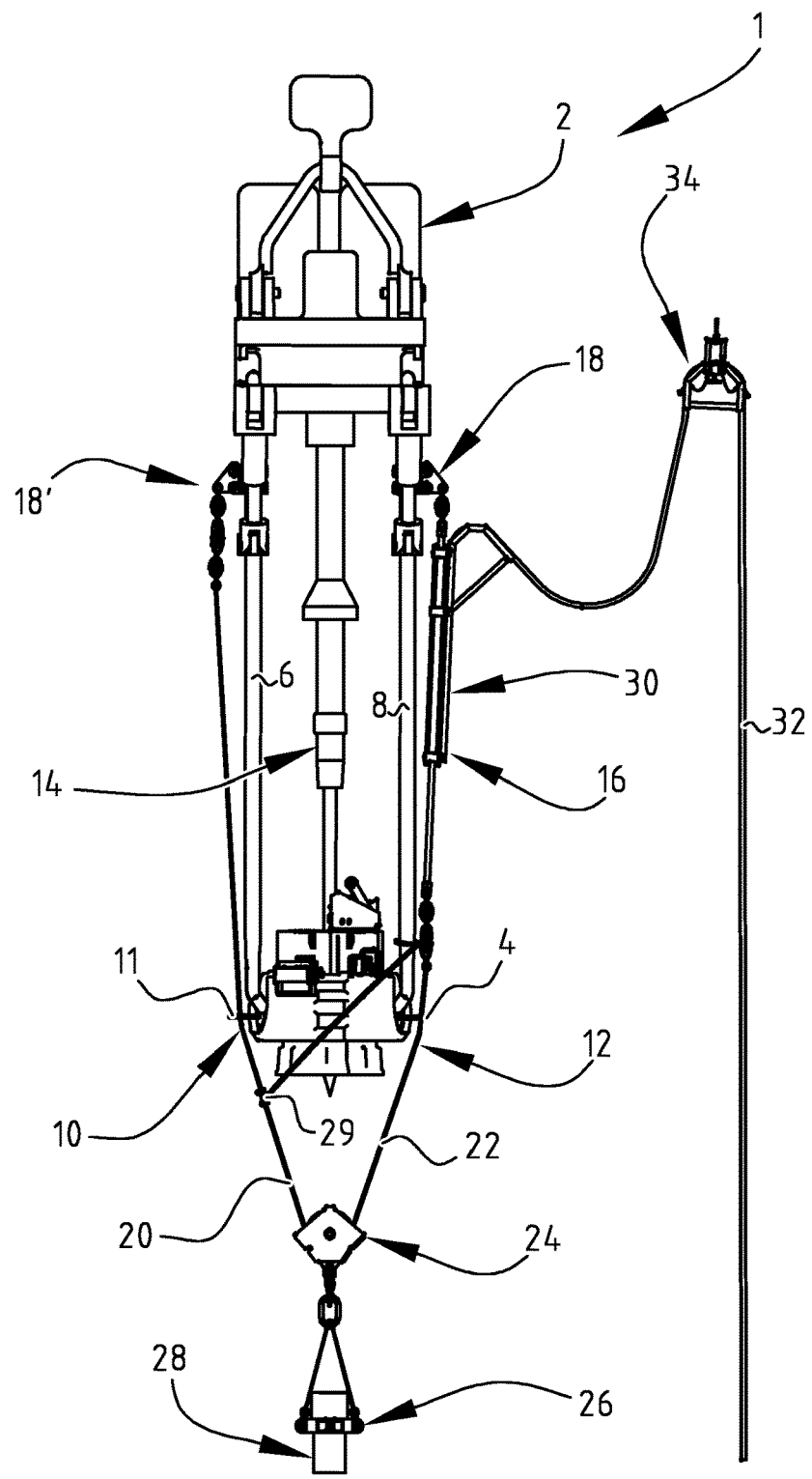
FIG. 1 shows a drilling rig assembly comprising a top drive, a main elevator and a single joint elevator, wherein the main elevator is suspended by two bails, and a device of a first embodiment of the invention is clamped to each of the bails.

Drilling rig 1 may comprise a top drive 2, from which a main elevator 4 is suspended via elevator bails 6, 8, also known as elevator links or linkage (FIG. 1). The main elevator 4 is provided with ears 10, 12. Each ear 10, 12 is connected to a loop at the lower end of a corresponding bail 6, 8.

A compensator 16 is suspended from bail 8 by means of the device 18 of an embodiment of the invention. The other bail 6 is provided with a device 18' of the same type. Lines 20, 22 connect the clamping devices 18, 18' with a sheave 24. The lines 20, 22 are further connected to the ears 10, 12 of the main elevator 4 via hooks 11, e.g. karabiners. A single joint elevator 26 is suspended from the sheave 24.

The example of FIG. 1 further shows the upper part of a joint 28, i.e. a pipe section 28, for positioning using the single joint elevator 26. An elastic line 29 is connected between line 20 and bail 8 to pull the sheave 24 and the single joint elevator 26 away from the well center when no joint 28 is suspended.

Drilling rig 1, or drilling rig assembly 1, of the example of FIG. 1 further comprises a fill-up tool 14.

In the embodiment shown, the main elevator 4 is of the slip type. However, other suitable types of elevators may be used. The bails 6, 8 in the exemplary embodiment have a minimum length of about 460 cm. However, for example shorter lengths are also possible according to the invention.

In the example shown in FIG. 1, the compensator 16 comprises a compensator cylinder 30 connected to a hydraulic or pneumatic line 32 suspended from a bundle support 34. However, other types of compensators may be used, such as a compensator comprising a spring.

FIG. 2A shows a close up of device 18 on bail 8. The upper end of bail 8 is provided with loop 8a. The device 18 comprises upper clamp 36 and lower clamp 38 which are provided on bail 8. Connecting plate 40 is connected to both clamps, and has coupling means for connecting a load, such as compensator 16 of the exemplary embodiment.

In FIG. 2A, the device 18 is shown in a safe state, wherein the load on the device 18 is within acceptable limits. The connection plate 40 is provided with a marking 42 for indicating that the device 18 is in a safe state. In the example shown, the marking 42 is a green dot. However, the invention is not limited to such a marking. For example, a textual marking may be used to indicate the safe state, e.g. instead of the green dot the connection plate may be marked with the letters "SAFE".

In FIG. 2B, the device 18 is shown in an unsafe state, wherein too much load is suspended from the device. Due to the overload, the lower clamp 38 is displaced downwards with respect to the upper clamp 36. This is illustrated by comparing distance D1 (FIG. 2A) and distance $D_2$ (FIG. 2B). This causes the connection plate 40 to move downwards with respect to the upper clamp 36. Due to the translational movement of connection plate 40, which is a downwards movement in the example shown, the green dot 42 is hidden, while a second marking 44 becomes visible. The second marking 44 is a red dot in the example shown, however alternatively a different marking can be used to indicate the unsafe state, such as a textual marking, e.g. "UNSAFE".

FIG. 2B further shows that the clamps 36, 38 are each formed of two interconnected parts 36a, 36b and 38a, 38b respectively.

To allow the movement of the connection plate 40 relative to the upper clamp 36, the connection plate 40 comprises a slit 48 (FIG. 3) for receiving a male coupling part for connecting the upper clamp 36. The male coupling part for connecting the upper clamp 36 is for example a bolt which is inserted in the slit 48. The connection plate 40 further comprises an opening 50 for receiving a further male part, such as a bolt, to connect the lower clamp 38 to the connection plate 40. The opening 50 and the further male part have a tight fit, such that translational movement of the connection plate 40 with respect to the lower clamp 38 is prevented. Some rotational movement of the connection plate 40 with respect to the lower clamp 38 may however be allowable. The connection plate 40 is further provided with an opening 52 for connecting the load to the connection plate. In the exemplary figure, the opening 50 has a circular shape. However, the opening 50 may be given a different shape instead, e.g. hexagonal. The opening 52 in FIG. 3 is of hexagonal shape, but may have a different shape instead, e.g. circular.

Figure 4:
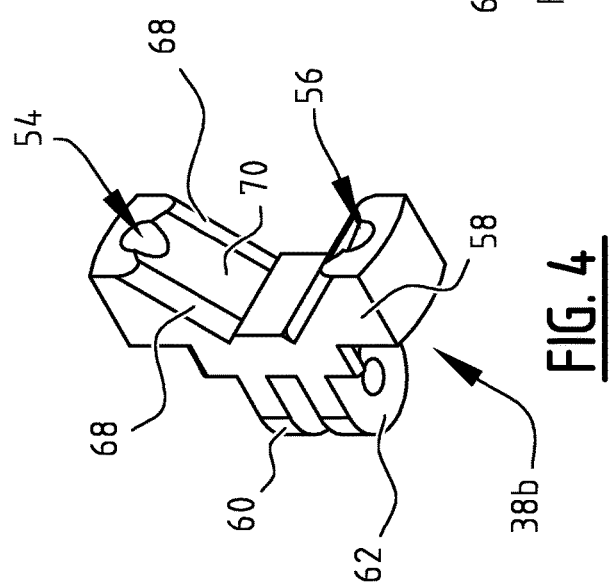
FIG. 4 shows a clamp to be used as upper bail clamp and/or lower bail clamp in a device of embodiments of the invention.

Each of the clamps 36, 38 comprises two parts 36a, 36b and 38a, 38b respectively. The two clamp parts 36a, 36b and 38a, 38b are joined together by a bolt and nut connection 53 (FIG. 5A). To this end the clamp parts 36a, 36b, 38a, 38b each have at least one through opening 54, 56 for receiving the bolt (FIG. 4). The clamp parts 36a, 36b, 38a, 38b each have a clamping portion 58 having a substantially V-shaped cross section. Alternatively, the clamping portion 58 may have a substantially C-shaped cross section. The clamping portions 58 of two corresponding clamp parts 36a, 36b and 38a, 38b are joined together around the bail 8, and the bolt and nut connection 53 is inserted and tightened to clamp the clamp 36, 38 on the bail 8.

A first clamp portion 36b, 38b of each clamp 36, 38 is provided with two spaced apart flanges 60, 62 (FIG. 4). The flanges 60, 62 are provided with openings for receiving a male coupling part, such as a bolts 64, 66, to attach the connection plate 40 to both clamps 36, 38 (FIG. 5A). In the embodiment of the figures, the other clamp portion 36a, 36b of the clamps 36, 38 does not comprise flanges, although it may optionally also be provided with such flanges.

The inner surface of the clamps 36, 38, i.e. the surface that faces the bail 8 when the clamp 36, 38 is fitted to the bail 8, is provided with at least one edge or rib 68 that is rounded of for contacting the bail 8. In the embodiment of the figures, the inner surface is provided with two opposing pairs of rounded off edges 68. Optionally, a groove 70 may be provided between each pair of rounded off edge 68.

Figure 5B:
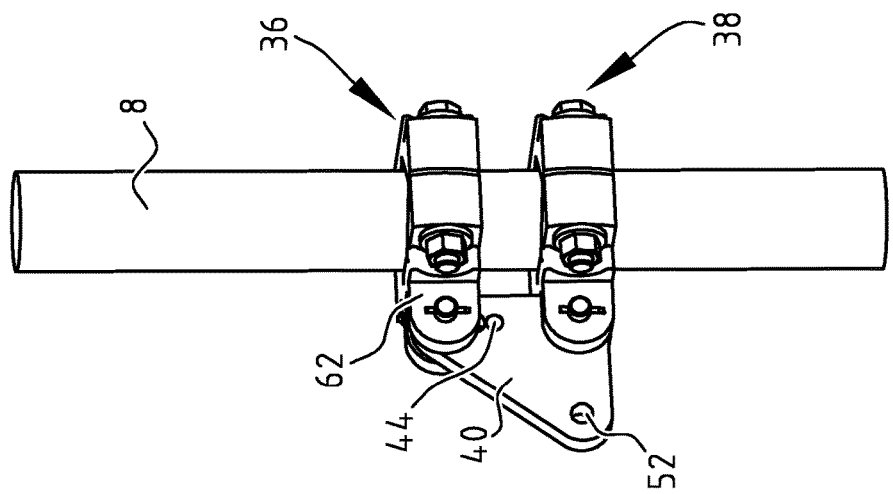
FIG. 5B shows the device of FIG. 5A in an unsafe operating state.
Figure 5A:
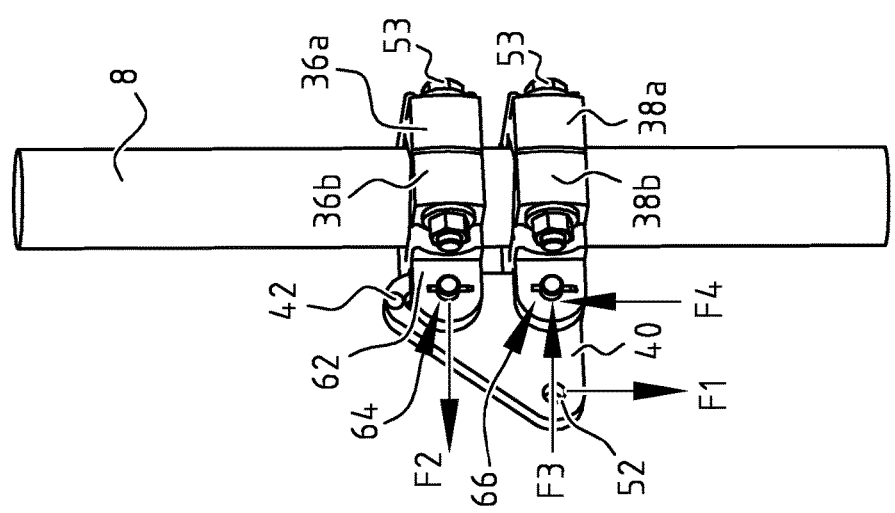
FIG. 5A shows a device according to an embodiment of the invention in a safe operating state, wherein applicable forces have been indicated.

As can be seen in FIGS. 5A and 5B, the safe indicator 42 is provided on one or both faces of the connecting plate 40, above the slit 48, while the unsafe indicator 44 is located on one or both faces of the connecting plate 40, below the slit 48. In the safe state (FIG. 5A), the safe indicator 42 above the slit 48 is situated above the flange 62 and therefore visible. When the connector plate 40 moves downward with respect to the upper clamp 36 due to an overload, i.e. the unsafe state (FIG. 5B), the safe indicator 42 also moves downward and ends up behind the flange 62 of the clamp 36. Therefore, in the unsafe state the safe indicator 42 is no longer visible. In contrast, the unsafe indicator 44 becomes visible as the connector plate moves downward with respect to the upper bail clamp 36, whereas the unsafe indicator 44 is masked from view behind flange 62 in the safe state (FIG. 5A).

FIG. 5A further illustrates the forces exerted on the device 18. The load applied to the device 18, e.g. the load of a compensator suspended from the device 18, is indicated as F1. The momentum in the connection plate 40 creates a force F2 the direction of which is perpendicular to the direction of the force F1. A force F3 results from the force F2, while a force F4 results from F1 countered by friction between the lower clamp 38 and the bail 8. The force F3 adds to the friction between the lower clamp 38 and the bail 8 without adding to the downward force.

When suspending load 16 from bails 6, 8 upper bail clamp 36 is clamped around bail 6, 8 and lower bail clamp 38 is clamped around bail 6, 8 at a position that in use is below upper bail clamp 36. Load 16 is connected to coupling means. This enables safe suspending a load, such as compensator 16, from bail 6, 8 of drilling rig 1.

The invention is by no means limited to the exemplary embodiments described above. The rights sought are defined by the following claims, within the scope of which many modifications can be envisaged. For example, features from a first embodiment may be applied in another embodiment to realize a new embodiment of the invention.

The invention claimed is:

1. A device for suspending loads from a bail of an elevator of a drilling rig, comprising:
   an upper bail clamp for clamping around the bail;
   a lower bail clamp for clamping around the bail; and
   a connecting part which is connected to the upper bail clamp by means of upper connecting means and connected to the lower bail clamp by means of lower connecting means, wherein the connecting part is further provided with a coupling means for connecting the connecting part to the load to be suspended from the bail,
   wherein at least one of the connecting means are arranged to allow translational movement of the connecting part with respect to one of the bail clamps, while another of the connecting means is arranged to prevent translational movement of the connecting part with respect to the other of the bail clamps.

2. The device according to claim 1, wherein the upper connecting means allow translational movement and comprise an elongated slot and a male part for insertion in said elongated slot, wherein the male part is movable within the elongated slot.

3. The device according to claim 2, wherein the elongated slot is provided in the connecting part.

4. The device according to claim 2, wherein the elongated slot is provided in the upper bail clamp.

5. The device according to claim 2, further comprising an indicator arranged to indicate the position of the connecting part with respect to the bail clamp.

6. The device according to claim 5, wherein the indicator is arranged to indicate a first position of the connecting part with respect to the bail clamp, as a safe position, and to indicate a second position, wherein the connecting part has moved with respect to the first position, as an unsafe position.

7. The device according to claim 2, wherein an inner surface of at least one of the upper bail clamp and the lower bail clamp, which inner surface in use faces the bail, has at least one rounded off edge for contacting the bail.

8. The device according to claim 7, wherein the inner surface comprises two rounded off edges.

9. The device according to claim 1, wherein the lower connecting means comprise an opening provided in the connecting part or the lower bail clamp, and a further male part for insertion in said opening.

10. The device according to claim 1, wherein the connecting part is plate-shaped.

11. The device according to claim 10, wherein the plate-shaped connecting part has a substantially triangular form.

12. The device according to claim 11, wherein the elongated slot or the male part of the upper connecting means are provided near a first corner of the triangular connecting part, wherein the opening or further male part of the lower connecting means are provided near a second corner of the triangular connecting part, and wherein the coupling means for connecting the connecting part to the load is provided near a third corner of the triangular connecting part.

13. The device according to claim 1, further comprising an indicator arranged to indicate the position of the connecting part with respect to the bail clamp, preferably the upper bail clamp.

14. The device according to claim 13, wherein the indicator is arranged to indicate a first position of the connecting part with respect to the bail clamp, as a safe position, and to indicate a second position, wherein the connecting part has moved with respect to the first position, as an unsafe position.

15. The device according to claim 1, wherein an inner surface of at least one of the upper bail clamp and the lower bail clamp, which inner surface in use faces the bail, has at least one rounded off edge for contacting the bail.

16. The device according to claim 15, wherein the inner surface comprises two rounded off edges.

17. The device according to claim 16, wherein a groove is provided between the rounded off edges of the inner surface.

18. The device according to claim 1, wherein at least one of the upper bail clamp and the lower bail clamp have a clamping portion comprising of two interconnectable parts, preferably having a substantially V-shaped cross section.

19. A drilling rig assembly comprising at least one elevator suspended from bails, a compensator connected to the elevator, and the device according to claim 1 which is connected to the compensator and at least one of the bails.

20. A method for suspending a load from a bail of an elevator of a drilling rig, the method comprising:
   providing the device according to claim 1;
   clamping the upper bail clamp around the bail;
   clamping the lower bail clamp around the bail, at a position below the upper bail clamp; and
   connecting the load to the coupling means of the connecting part.

\* \* \* \* \*